(No Model.) 2 Sheets—Sheet 1.

J. W. WINTERS.
CAR BRAKE ADJUSTER.

No. 517,088. Patented Mar. 27, 1894.

Witnesses:
C. R. Caldwell
H. S. Johnson

Inventor:
John W. Winters.
per L. L. Merwin
Attorney.

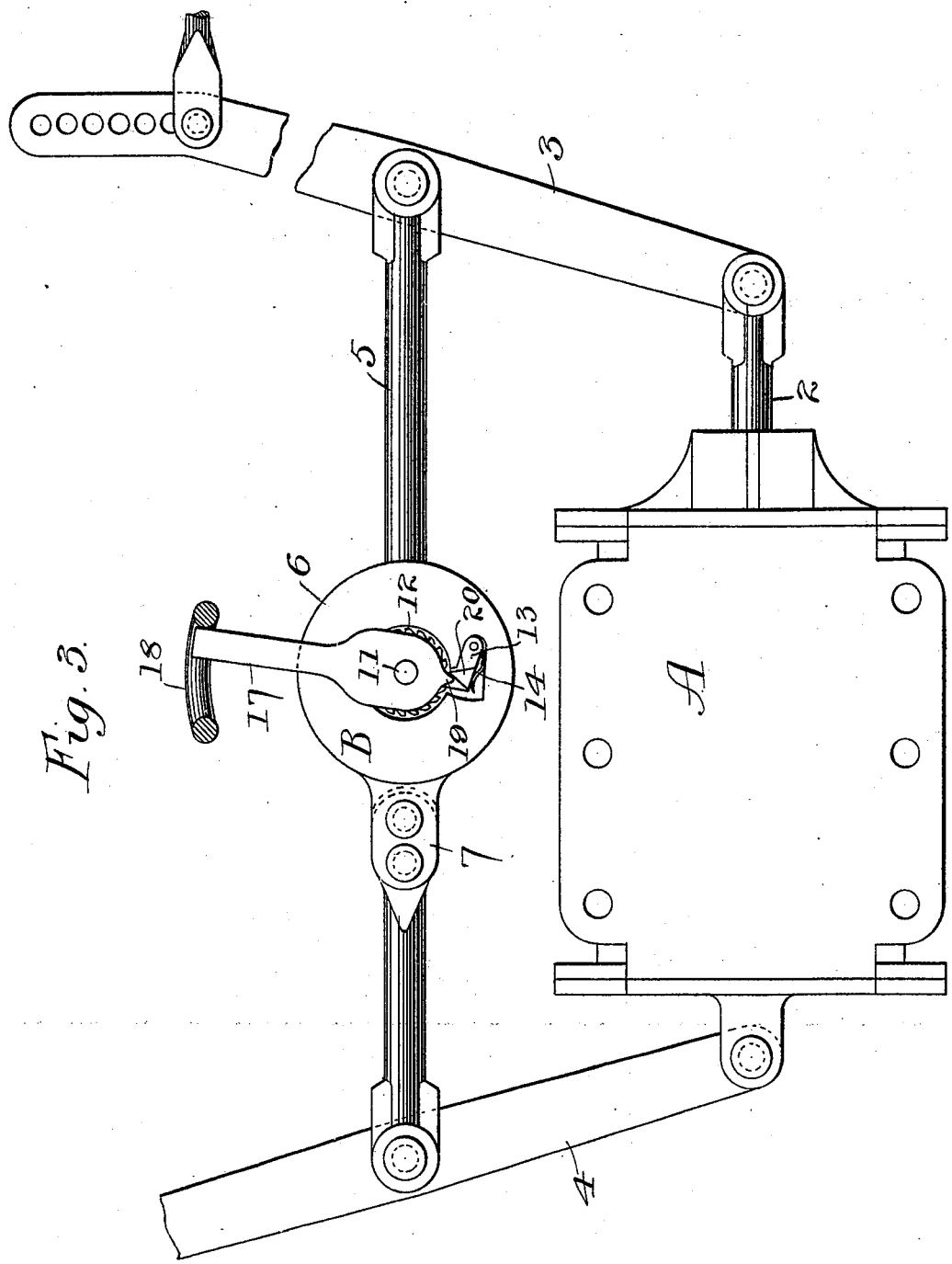

UNITED STATES PATENT OFFICE.

JOHN W. WINTERS, OF ST. PAUL, MINNESOTA, ASSIGNOR OF FIVE-SIXTHS TO ALBERT J. KOS, JERRY WEBBER, EDMUND R. GREENWOOD, DEVILLE H. KENT, AND JOHN GELINA, OF SAME PLACE.

CAR-BRAKE ADJUSTER.

SPECIFICATION forming part of Letters Patent No. 517,088, dated March 27, 1894.

Application filed July 15, 1893. Serial No. 480,583. (No model.)

*To all whom it may concern:*

Be it known that I, JOHN W. WINTERS, of St. Paul, Ramsey county, Minnesota, have invented certain Improvements in Automatic Air-Brake Adjusters, of which the following is a specification.

My invention relates to improvements in attachments to air brakes, its object being to provide improved means to automatically compensate for the wear of the brake shoes, and consists in the construction hereinafter described and claimed.

Figure 1:
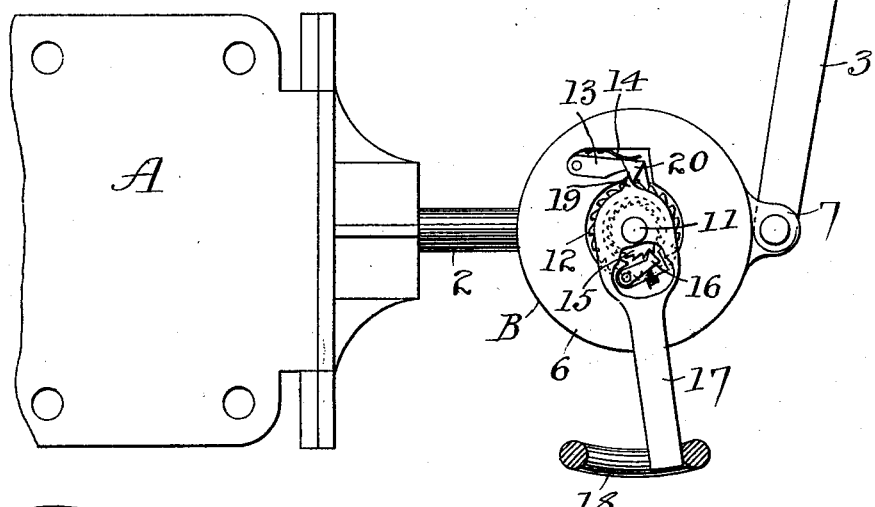
Figure 2:
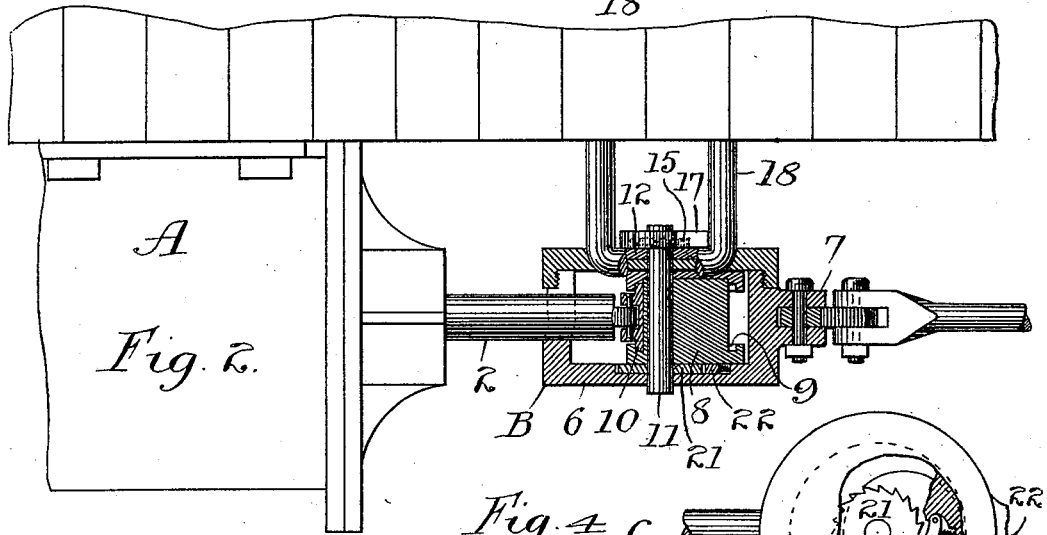
Figures 4, 5, 6:
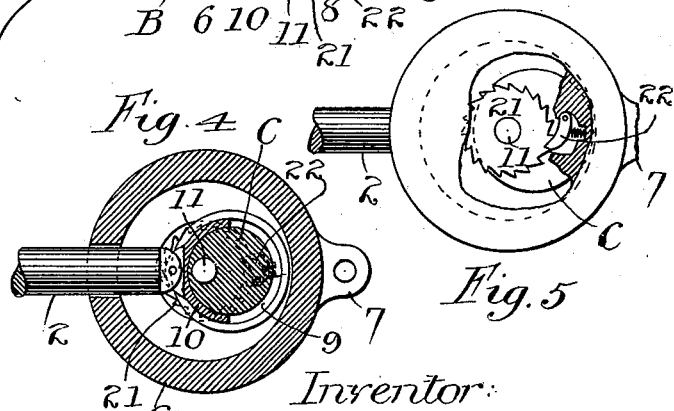

In the accompanying drawings forming part of this specification: Figure 1 is a plan view of my improved adjuster shown, applied to the air cylinder piston rod. Fig. 2 is a sectional side elevation of the same showing the internal construction of the device. Fig. 3 is a plan view of the device attached to or made a part of the rod connecting the brake levers, and Figs. 4, 5 and 6 are details.

In the drawings A represents the air cylinder adapted to be connected underneath the body of the car in the ordinary manner.

2 is the rod of the piston working in the cylinder, 3 the brake lever connected to the piston rod and 4 the brake lever connected to the opposite end of the cylinder, both levers being connected in the ordinary manner to the brake mechanism.

As shown in Figs. 1 and 2 my device is applied to the piston rod, while in Fig. 3 it is shown connected to the rod 5 which connects the levers 3 and 4. The adjuster B is made up of the cylindrical case 6 which has a projection or ear 7 by means of which it is connected to the brake mechanism. Arranged in the case 6 is the eccentric C which is made up of the block 8, having a circumferential inverted T shaped groove 9 in which works the shoe 10, which is connected to the other part of the brake mechanism, as shown in Figs. 1, 2, 4, 5 and 6 this other part is connected to the piston rod 2. The eccentric is fixed on the pin 11 which turns in the case 6. On top of the case 6 and fixed to the pin is the ratchet 12, with which engages the pawl 13 controlled by the spring 14. Above this ratchet is fixed also the similar ratchet 15, having its teeth oppositely inclined, with which engages the spring controlled pawl 16 pivoted to the arm 17, which is mounted and turns freely upon the pin 11. This arm projects into the yoke shaped loop 18 depending from the bottom of the car whereby its movement is limited as shown. It is also provided with the oppositely projecting point or spur 19 which is adapted to engage the spur 20 carried by the pawl 13 so as to throw the pawl out of engagement with the ratchet 12. Similarly fixed on the other end of the pin 11 is the ratchet 21 the teeth of which are inclined oppositely to those of the ratchet 12, and are engaged by the spring controlled pawl 22 pivoted to the case 6. It will thus be seen that as the arm 17 is oscillated the pawl 16 engaging the ratchet 15 turns the eccentric around step by step, the point 19 carried by the arm 17 throwing the pawl 13 out of engagement with its ratchet so as to permit the eccentric to turn, the movement of the eccentric thus gained being held by the ratchet 21 and further movement prevented by the pawl 13 so that the eccentric is held firmly from movement in either direction, except as actuated by the lever 17.

The parts are so arranged that the lever 17 is not operated so as to turn the eccentric until by the wearing of the brake shoes, the thrust of the piston rod 2 or the part to which it is connected exceeds the limited movement desired. When this takes place the arm 17 coming in contact with the yoke 18, is turned on the pin 11 until the pawl 16 has engaged the next tooth in the ratchet. With the reverse movement of the piston rod the arm is struck by the other member of the yoke and carried forward turning the eccentric, the point 19 throwing the pawl 13 out of engagement with the ratchet 12. The eccentric thus slightly shortens the distance between its point of connection with the piston rod and the pivot connecting the adjuster to the brake lever so that the wear upon the brake shoes is gradually compensated.

In the modified construction shown in detail Fig. 6, the rod 2 is shown rigidly connected to the shoe 10 which in some cases is a preferred construction.

In the construction shown in Fig. 3, the adjuster is differently applied to the brake mechanism, but its construction and function are identical with those of the construction shown in the other figures.

I claim—

1. In a device of the class described, the combination with the brake mechanism and the air cylinder, of the interposed eccentric, its cylinder, the pawl and ratchet connection between the eccentric and its cylinder, the lever connected to said pawl and ratchet mechanism and means for operating said lever when the thrust of the piston rod exceeds its limit, substantially as described.

2. In an automatic brake adjuster, the combination with the cylinder connected to one part of the mechanism, of the eccentric arranged in said cylinder, the shoe working in a circumferential guide upon said eccentric and connected to the other part of the brake mechanism, the oppositely arranged pawl and ratchet attachments carried by said eccentric, the operating arm having a pawl and ratchet connection with said eccentric, and means for actuating the same when the thrust of the piston rod exceeds a predetermined limit, substantially as described.

3. In a device of the class described, the combination with the cylinder, of the eccentric arranged therein and having an inverted T shaped circumferential groove, the shoe working in said groove, the oppositely acting pawl and ratchet mechanisms carried by said eccentric, the arm mounted upon the pivot pin of the eccentric and having a pawl and ratchet connection therewith, means carried by said arm for tripping the ratchet mechanism opposed to the ratchet mechanism carried by the arm, and means for operating said arm to turn its ratchet mechanism when the piston rod exceeds its limit of movement, substantially as described.

In testimony whereof I have hereunto set my hand this 7th day of July, 1893.

JOHN W. WINTERS.

Witnesses:
   T. D. MERWIN,
   H. S. JOHNSON.